United States Patent
Lindemann et al.

(10) Patent No.: US 7,856,901 B2
(45) Date of Patent: Dec. 28, 2010

(54) ACTUATING DEVICE FOR A MOTOR VEHICLE TRANSMISSION

(75) Inventors: Patrick Lindemann, Wooster, OH (US); Trevor McConnell, Rittman, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 771 days.

(21) Appl. No.: 11/356,813

(22) Filed: Feb. 17, 2006

(65) Prior Publication Data

US 2006/0207360 A1    Sep. 21, 2006

Related U.S. Application Data

(60) Provisional application No. 60/655,349, filed on Feb. 23, 2005.

(51) Int. Cl.
 *F16H 27/02* (2006.01)
(52) U.S. Cl. .................................................. 74/89.38
(58) Field of Classification Search ............... 74/89.23, 74/89.39, 89.37, 89.42, 89.38, 89.36; 180/347; 192/141, 54.51, 54.52, 93 C
See application file for complete search history.

(56) References Cited

U.S. PATENT DOCUMENTS

| 2,758,485 | A | * | 8/1956 | Jahnel | 74/89.39 |
|---|---|---|---|---|---|
| 2,791,129 | A | * | 5/1957 | Russell | 74/441 |
| 2,875,630 | A | * | 3/1959 | Douglas et al. | 74/89.39 |
| 3,176,811 | A | * | 4/1965 | Smith | 192/54.51 |
| 4,249,426 | A | * | 2/1981 | Erikson et al. | 74/441 |
| 4,425,814 | A | * | 1/1984 | Dick | 74/89.38 |
| 4,782,715 | A | * | 11/1988 | Chevance | 74/89.39 |
| 5,689,995 | A | * | 11/1997 | Heckel, Jr. | 74/89.39 |
| 5,689,997 | A | | 11/1997 | Schaller | 74/335 |
| 5,778,733 | A | * | 7/1998 | Stringer | 74/527 |
| 7,026,770 | B2 | | 4/2006 | Hemphill et al. | 318/9 |
| 2002/0011126 | A1 | | 1/2002 | Christopher | 74/89.23 |

FOREIGN PATENT DOCUMENTS

| DE | 10 2004 038 955 | 3/2005 |
|---|---|---|
| EP | 0 259 641 | 3/1988 |
| EP | 0 636 819 | 2/1995 |

* cited by examiner

*Primary Examiner*—Richard W Ridley
*Assistant Examiner*—Alan B Waits
(74) *Attorney, Agent, or Firm*—Simpson & Simpson, PLLC

(57) ABSTRACT

An actuating device for a motor vehicle transmission having multiple transmission steps, having a threaded spindle which is mounted so it is rotationally movable and axially fixed and a spindle nut which is positioned on this threaded spindle and may be driven thereby, and also having a first component, which is positioned so it is axially fixed and rotatable to select gears of the motor vehicle transmission, which may be coupled and/or is coupled via a rotational carrier unit to the spindle nut, so that the first component may be driven to rotate by the threaded spindle via the spindle nut to select gears, a braking unit being provided to reduce and/or avoid axial position changes of the spindle nut caused by mass inertia as a result a braking procedures of the threaded spindle from a movement rotationally driving the first component; as well as a motor vehicle transmission unit, a motor vehicle drivetrain, and a method for reducing or avoiding control errors caused by mass inertia in the control of gear changing actions in a motor vehicle transmission.

5 Claims, 4 Drawing Sheets

US 7,856,901 B2

ACTUATING DEVICE FOR A MOTOR VEHICLE TRANSMISSION

CROSS REFERENCE TO RELATED APPLICATIONS

This patent application claims the benefit under 35 U.S.C. §119(e) of U.S. Provisional Application No. 60/655,349, filed Feb. 23, 2005, which application is incorporated herein by reference.

FIELD OF THE INVENTION

The present invention relates to an actuating device for a motor vehicle transmission, a motor vehicle transmission unit having an actuating device of this type, a motor vehicle drivetrain having a motor vehicle transmission unit of this type, and a method for reducing or avoiding control errors due to mass inertia in the control of gear change actions in a motor vehicle transmission.

BACKGROUND OF THE INVENTION

Actuating devices are typically provided for engaging and disengaging gears in motor vehicle transmissions. Known actuating devices for classic manual transmissions are typically provided with a shift linkage. The drive energy, which is required for engaging and disengaging gears, is essentially completely applied by the driver in this case, who introduces it manually into a shift lever coupled to the shift linkage. Furthermore, actuating devices are known which have an electric motor and/or an arrangement of electric motors, using which gears are engaged and disengaged. Actuating devices of this type are known to be used—in diverse embodiments—in, for example, auto shift transmissions (AST), uninterrupted shift transmissions (UST), electrical shift transmissions (EST), or in parallel shift transmissions (PST) and/or twin-clutch transmissions (TCT).

The actuating device, including the electric motor(s), is also referred to as an actuator in the designs of the latter type. The actuator typically is coupled in the motor vehicle to an internal gear shifter, which has shift rails and/or shift forks and/or shift sleeves, for example, and may load this internal gear shifter. An electronic control unit is known to be provided to activate the electric motors. This electronic control unit activates the electric motors, which is typically performed as a function of diverse characteristic values, in particular operating characteristic values of the motor vehicle, such as engine speed and/or engine torque or the like. In this case, an operating element may be provided, via which the driver may select diverse modes (e.g., forward (D), reverse (R), park (P), shift up (+), shift down (−)), as a function of which the electronic control unit activates the electric motors.

Furthermore, it is known that actuators of this type have a first electric motor, which causes selection movements, and a second electric motor, different therefrom, which generates the shift movements. In addition, it is known that the output and/or drive shafts of these two electric motors are each coupled via suitable mechanical units to a selector shaft in such a way that this selector shaft may be pivoted around its longitudinal axis using one electric motor and may be moved translationally in the direction of its longitudinal axis using the other of the two electric motors. The shifting is caused in this case through a corresponding pivot of this selector shaft and the selection is caused in this case by a corresponding translational movement of the selector shaft, or vice versa.

In addition, the applicant has developed actuating devices and/or actuators for motor vehicle transmissions, which manage with only one electric motor, i.e., in which the selection and the shifting may be caused using precisely one electric motor. Exemplary embodiments of this type are disclosed in DE 10 2004 038 955 of the applicant.

For example, in the embodiments of the type explained in FIGS. 9a through 24 of DE 10 2004 038 955 a problem may occur—at least under unfavorable conditions—which is to be explained in the following on the basis of FIGS. 6a and 6b.

FIGS. 6a and 6b show a detail of an exemplary 1-motor transmission actuator and/or an exemplary actuating device for a motor vehicle transmission, which may otherwise be implemented, for example, like the embodiment according to FIGS. 9a through 24 of DE 10 2004 038 955.

FIGS. 6a and 6b particularly show a threaded spindle 330, and a spindle nut 332 and a first movably positioned component 376, which is particularly an eccentric 376. The first component 376 is positioned so it is axially fixed and rotationally movable and is referred to in the following as the eccentric 376. A wedge gearing connection is provided between the eccentric 376 and the spindle nut 332, which is schematically indicated in the cutaway area of FIG. 6a by the arrow 491 and which particularly acts as a rotational carrier unit. The spindle nut 332 has an internal thread, which engages in an external thread of the threaded spindle 330. The corresponding threaded connection is indicated in the cutaway area of FIG. 6a by the arrow 490.

The threaded spindle 330 is positioned so it is rotationally movable and axially fixed and may be alternately driven by an electric motor (not shown) in opposite rotational directions. The spindle nut 332 is positioned so it is essentially rotationally movable in the axial position, which is shown in FIGS. 6a and 6b. This axial position may be approached in that the threaded spindle 330 and/or the electric motor connected thereto rotates and/or drives in such a way that the spindle nut 332 travels in the direction of the eccentric 376. The corresponding rotational direction of the spindle nut 332 and/or the electric motor corresponds to the selection direction of this spindle nut 332 and/or this electric motor. In the axial position of the spindle nut 332 shown in FIGS. 6a and 6b, the spindle nut 332 stops axially on a stop which, in the event of a movement of the threaded spindle 330 and/or the electric motor in the selection direction, blocks the axial mobility of the spindle nut 332. In the event of continued movement of the threaded spindle 330 and/or the electric motor in the selection direction in particular, the threaded spindle 330, the spindle nut 332, and the eccentric 376 rotate and/or move jointly. This may be exploited to select a gear.

The selection direction of the threaded spindle 330 and/or the rotational movement of the threaded spindle 330 in the selection direction and/or the selection movement of the threaded spindle 330 is schematically indicated in FIG. 6a by the arrow 492. The (rotational) movement of the eccentric 376 triggered in this case by and/or upon the coupling of threaded spindle 330, spindle nut 332, and eccentric 376 is schematically indicated in FIG. 6a by the arrow 494.

Now, however, if in and/or from this state, in which the spindle nut 332 and the eccentric 376 are rotationally carried by the threaded spindle 330 (particularly in the selection direction), the threaded spindle 330 and/or the electric motor is suddenly stopped—which is schematically indicated by the symbol 496 in FIG. 6b—the eccentric 376 rotates further and/or its inertial mass causes the eccentric to be moved further. In this way (because of this), the spindle nut 332 travels along the threaded spindle 330, particularly in the direction directed away from the stop and/or the spindle nut 332. This may particularly be attributed to the inertial mass and/or energy and/or the mass inertia torque of the eccentric 376 and/or the corresponding influence of any components coupled thereto and carried therewith (cf. arrow 493 in FIG. 6b). Under unfavorable conditions, this may possibly result in the eccentric 376 being moved into a (selection) position, from which a shift may be made into an undesired gear. Furthermore, this may result in the position of the spindle nut 332 and/or the eccentric 376 and/or the first component no longer being able to be concluded sufficiently correctly from the position information provided by the controller, so that under unfavorable conditions incorrect operations may result. This is because, in units of this type, the position information may be ascertained via an incremental sensor provided on the electric motor and/or its output shaft and provided to the controller.

Thus, particularly because of the lack of a "fixed" connection between the eccentric 376 and connected mass inertias and the threaded spindle 330 and/or the motor, it is made more difficult or impossible to stop the mechanism during braking-particularly without disadvantages. This would be desirable particularly in regard to short shifting times, however.

It is to be noted that the problem discussed may also possibly occur—at least partially—if the threaded spindle 330 is driven in the direction opposite the selection direction, particularly if the spindle nut 332 is not supported in relation to the housing or is not supported rotationally fixed in relation to the housing.

BRIEF SUMMARY OF THE INVENTION

The present invention is based on the object of providing an actuating device for motor vehicle transmissions, in which the problem described on the basis of FIGS. 6a and 6b is not as strongly pronounced as in the embodiment therein.

An actuating device for a motor vehicle transmission is particularly suggested according to the present invention. This motor vehicle transmission has multiple transmission steps to form gears. The actuating device has a threaded spindle, which is mounted so it is rotationally movable and axially fixed, and a spindle nut, which is positioned on this threaded spindle and drivable by it. Furthermore, the actuating device has a first component, which is axially fixed and positioned so it is rotationally movable for the selection of gears of the motor vehicle transmission, and is an eccentric, for example. In addition, a rotational carrier unit is provided, using which the spindle nut and the first component may be coupled and/or are coupled. The first component may be rotationally driven to select gears. This rotational driving may be performed using the threaded spindle via the spindle nut. To reduce and/or avoid axial position changes of the spindle nut caused by mass inertia as a result of braking procedures of the threaded spindle from a movement rotationally driving the first component, a braking unit is provided.

The braking unit may, for example, be positioned or act between the spindle nut and the first component and/or act during braking. According to the present invention, it is also suggested in particular that a locking unit be provided between the first component and the spindle nut. This locking unit particularly has at least one loosened position and at least one locked position. The locking unit may, for example, be used for changing or avoiding axial position changes of the spindle nut caused by mass inertia as a result of braking procedures of the threaded spindle from a movement rotationally driving the first component.

In an advantageous embodiment, the first component is coupled to a second component in such a way that a rotational movement of the first component causes a linear movement of this second component. This may, for example, be done so that the first component is implemented as an eccentric and is coupled via a corresponding mechanism to the second component. In this case, the movement direction in which the second component may be linearly moved may be laid essentially perpendicular to the rotational axis of the threaded spindle. In an especially advantageous embodiment, a second component of this type, which may be a sleeve, for example, is coupled to a selector shaft. The second component may, for example, be positioned concentrically to such a selector shaft.

In an especially advantageous implementation, the longitudinal axis of such a selector shaft is laid essentially perpendicular to the central longitudinal axis of the spindle. This perpendicular position may be such that an intersection of the two above-mentioned longitudinal axes exists or such that the central longitudinal axes discussed are offset to one another.

In particular in an embodiment of the above-mentioned type, the selector shaft may be axially moved using a rotational movement of the first component and/or eccentric. As already noted, a second component may be provided which is coupled to such a selector shaft. In this case, the first component and/or the eccentric may be coupled via a corresponding linkage or guide lever or the like to the second component. In this case, this linkage and/or the guide lever may have an annular or (hollow) cylindrical section or be coupled to such a section, the first component, and/or the eccentric having an eccentric disk, which has a cylindrical external surface. The annular or (hollow) cylindrical section discussed may engage in the external surface of such an eccentric disk. The eccentric disk is positioned eccentrically in relation to the rotational axis of the eccentric in such an embodiment, so that a rotation of the eccentric causes the second component to be able to be moved axially via the engaging annular or (hollow) cylindrical section and the lever or the linkage. For example, in this way the selector shaft may be axially displaced for the selection through a rotation of the eccentric and/or first component.

Furthermore, such a selector shaft may be positioned so it is rotationally movable, particularly in opposite directions, for shifting and/or engaging and disengaging gears. For the selection, the selector shaft may be axially movable, for example. The selector shaft may be provided with a shift finger. Such a shift finger may particularly be provided for interaction with an internal gear shifter for engaging gears. For example, such an internal gear shifter may have multiple shift rails or shift forks, each of which is provided with a shift mouth, in which a shift finger of this type may engage for operation.

Furthermore, the actuating device may be such that a gear in the transmission may be engaged using it and after such a gear is engaged, a selection may be made using the actuating device without the previously engaged gear being disengaged again at the same time. Furthermore, upon a gear being engaged, it may be ensured by the embodiment of the actuating device and/or the interaction with an internal gear shifter of the motor vehicle transmission that all gears of the transmission or—if multiple partial transmissions are provided—of the particular partial transmission are disengaged before shifting into another gear (of this transmission and/or partial transmission).

In an especially preferred embodiment, the rotational axis of the first component is laid concentrically to the rotational axis of the spindle. For example, the threaded spindle may also extend into or through the first component.

In an advantageous embodiment, the rotational carrier unit is formed by two interacting wedge gearing, one of these wedge gearing being positioned on the spindle nut, the other of these two wedge gearing being provided on the first component.

The braking unit and/or the locking unit have/has a spring and/or are/is spring-loaded in an advantageous embodiment. Such a spring may, for example, be a coil spring. The spring is particularly a pre-tensioned spring. In principle, however, other springs may be provided, such as a disk spring or a torsion spring or the like. Furthermore, the braking unit and/or the locking unit may have at least one element loaded by this spring. This may, for example, be a ring and/or one or more balls—which are particularly positioned distributed around the circumference.

For example, a ring of this type—in relation to its axis—may be essentially axially loaded by the spring, and this ring acts on a ball via a contact area. The contact area may be oriented in this case, for example, in such a way that the force exerted by the spring on the ball is not laid in the direction of the spring axis. In particular, it may be oriented transversely thereto and/or at an angle to the axis discussed.

The spring may, for example, extend parallel to the longitudinal axis of the threaded spindle, which is particularly true if this is a coil spring, and/or may act parallel to this longitudinal axis.

In an advantageous embodiment, the spindle nut has at least one impression for receiving an element spring-loaded using the spring. This depression may, for example, be a groove, such as an annular groove, or a pocket or the like. The depression may, for example, be an annular groove, which extends around the circumference of the spindle. Such an annular groove may be closed around the circumference. However, an annular groove of this type may also not be closed around the circumference, but rather extend only over a certain angle of the circumference. The depression discussed is especially preferably intended to receive a ball, which may be spring-loaded by the spring.

The depression is advantageously implemented in such a way that the element discussed, i.e., particularly a ball, may not penetrate completely into this depression in such a way that the entire element and/or the entire ball is positioned and/or sunk into the depression. In particular, the depth of the depression is thus smaller than the extension direction of the ball laid in this direction. If a spring-loaded element of this type, referred to in the following as "ball" for simplicity, is positioned in the depression, the spindle nut then advantageously blocks in relation to the first component, particularly the eccentric. This blocking and/or locking position is particularly such that the spindle may press the ball out of the depression through a corresponding load. In particular, the retention force of the spring may be overcome in this case, particularly by having the electric motor load the threaded spindle with a corresponding drive energy. The spring may cause the ball to be pressed automatically into the depression if the threaded spindle is stopped from a state in which it has driven the first component. The retention force of the locking unit and/or the braking unit and/or the spring is particularly such that any mass inertia forces and/or torques and/or energy of the first component are insufficient to press the ball and/or the corresponding part thereof dipping into the depression out of the depression.

The actuating device may have a housing, which at least partially receives it. A housing of this type may, for example, be molded onto a transmission housing and/or be held on such a housing—particularly removably. In a preferred embodiment, a twist lock for the spindle nut—particularly one fixed on the housing—is provided. In particular, this twist lock does not act over the entire axial position range of the spindle nut. For example, wedge gearing may be positioned fixed on the housing and wedge gearing or a wedge or a tooth is also connected to the spindle nut, which may engage in the wedge gearing fixed on the housing in order to secure the spindle nut against twisting. Such a twist lock is particularly implemented so that it acts in both rotational directions. Furthermore, an axial position range of the spindle nut is particularly provided, in which this nut is moved out of this twist lock and/or in which the twist lock no longer acts on the spindle nut. This is particularly a range in which the first component may be rotated and/or pivoted for the selection using the spindle via the spindle nut.

As discussed, the threaded spindle may be rotated in opposite directions. In order to drive the spindle in these opposite rotational directions, an electric motor is particularly provided, whose output shaft may be driven by it in opposite rotational directions. One rotational direction of this electric motor and/or the spindle is particularly a selection direction in this case, and the other rotational direction of this electric motor and/or the threaded spindle is particularly a shift direction. In an advantageous embodiment, the spindle nut travels axially from a position in which it is twist-locked in relation to the housing, through driving of the electric motor and/or the threaded spindle, in its selection direction. In this case, when the spindle nut has traveled out of its twist lock, this spindle nut drives the first component to rotate upon continued rotation of the electric motor and/or the threaded spindle in the selection direction. A corresponding stop for the spindle nut may be provided, on which this nut stops upon continued movement in the selection direction of the spindle, after it has traveled out of the twist lock. When the spindle nut stops on such a stop, it may no longer be moved axially in relation to the threaded spindle, so that it is rotationally carried upon a spindle rotation. It may then carry the first component via a corresponding rotational carrier. The spindle nut may stop on such a stop essentially directly after moving out of the twist lock discussed. Suitable measures may also support the spindle nut being able to travel axially after traveling out of the twist lock discussed upon a rotation of the threaded spindle. This may be caused, for example, using a friction unit, which is fixed on the housing and acts on the spindle nut or the first component, for example.

Furthermore, a freewheel acting on one side may be provided, which may act directly or indirectly on the spindle nut. Such a freewheel acting on one side may be formed between a housing and the eccentric or between a housing and the spindle nut, for example. Such a freewheel may be implemented in such a way that it allows movement in one rotational direction and blocks movement in another rotational direction. For this purpose, for example, a corresponding profile may be positioned on the spindle nut or on the first component, for example, which interacts with a catch. The freewheel acting on one side is particularly implemented so that one rotational direction of the first component is assigned to the freewheel direction and the opposite direction is assigned to the block direction of the freewheel. In particular, the freewheel direction is the direction in which the first component is driven by the spindle via the spindle nut when the spindle nut is in a corresponding axial position and the spindle is driven in the selection direction. The blocking positions of the freewheel acting on one side are particularly implemented so that it is ensured that after the selection of a gear, the corresponding selection position and/or the selection position range of the first component assigned to a predefined gear is essentially maintained, and/or approaching a selection position assigned to a neighboring gear or a gear at a further distance is avoided as much as possible. The latter may alternatively also be caused through a corresponding lock. The freewheel acting on one side may also be used for the purpose, for example, of ensuring that the spindle nut "returns" axially when the spindle is driven and/or moved for shifting in the shift direction after a selection.

In an advantageous embodiment, in a range in which the spindle is moved axially, using this axial movement of the spindle nut, the shifting of the transmission may be caused. For this purpose, a corresponding mechanism may be provided, for example, which transfers an axial position change of the spindle nut into a pivot movement of the selector shaft—if provided. In particular, this mechanism is implemented in such a way that it only acts in a predefined axial position range of the nut. For example, this may be an axial position range in which the spindle nut is twist-locked in relation to the housing or a partial range of an axial position range in which the nut is twist-locked in relation to the housing. An exemplary embodiment of a mechanism of this type is explained in FIGS. 9 through 24 of DE 10 2004 038 955. Reference is made to the entirety of the embodiment therein, particularly also in regard to this mechanism discussed, and made the subject matter of the present disclosure by reference.

In an advantageous embodiment, an incremental sensor is provided, using which position changes of the actuator and/or the output shaft of the electric motor of such an actuator may be ascertained. The electric motor advantageously has a signal connection to an electronic control unit and/or may be activated by such an electronic control unit.

In an especially advantageous embodiment, an actuating device and/or unit according to DE 10 2004 038 955 or a motor vehicle transmission according to DE 10 2004 038 955 or a drivetrain according to DE 10 2004 038 955 is refined according to the present invention, i.e., particularly provided with a braking unit for reducing and/or avoiding axial position changes of the spindle nut caused by mass inertia as a result of braking procedures of the threaded spindle from a movement rotationally driving the first component, such as an eccentric. In regard to refinements of the present invention of this type, the content of the disclosure of DE 10 2004 038 955, and particularly the content of the disclosure of FIGS. 9a through 24 therein, in addition to the associated description, are included in their entirety in the present disclosure through reference.

BRIEF DESCRIPTION OF THE DRAWINGS

In the following, an exemplary embodiment of the present invention is to be described on the basis of the figures.

DETAILED DESCRIPTION OF THE INVENTION

Figure 1:
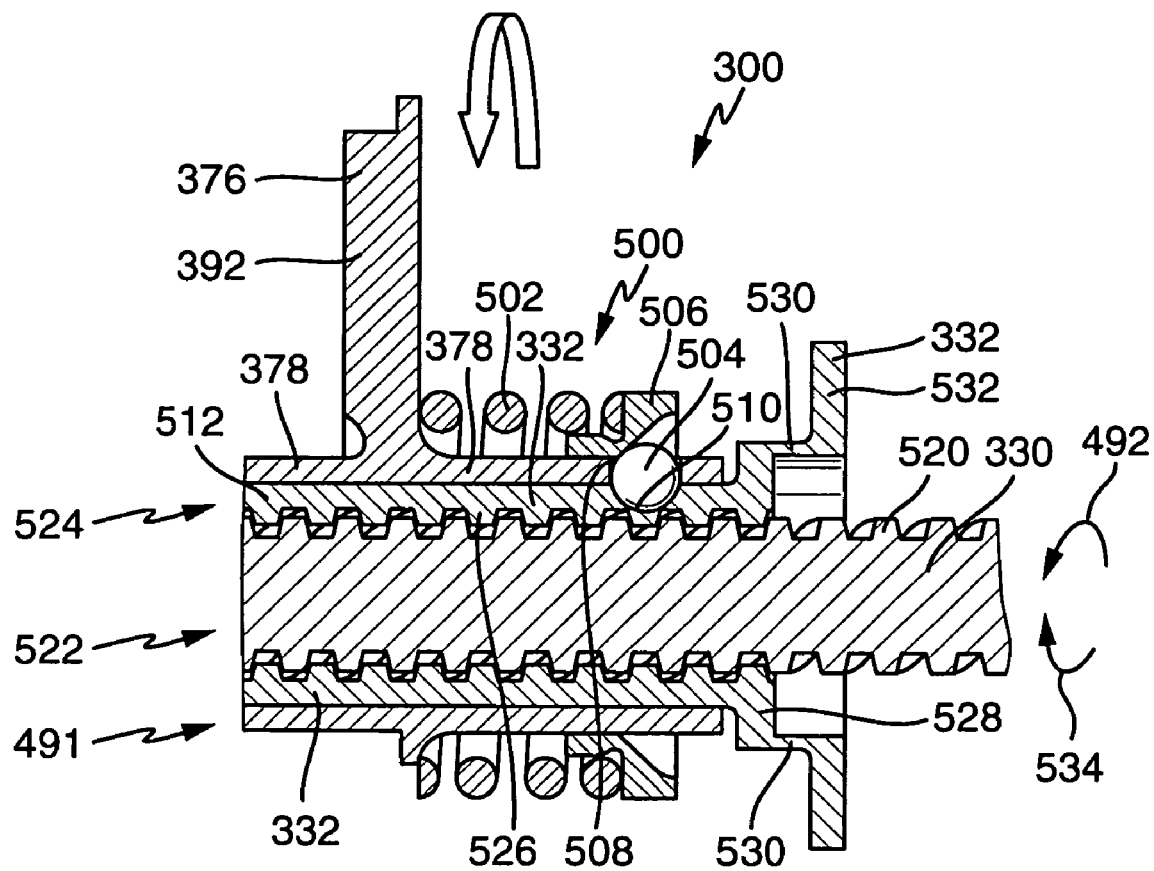
FIG. 1 shows an exemplary actuating device according to the present invention in a schematic partial view.

FIGS. 1 through 5 show an exemplary actuating device 300 according to the present invention in a schematic partial view. The actuating device 300 is particularly a transmission actuator, particularly a 1-motor transmission actuator.

The actuating device 300 has a threaded spindle 330, as well as a spindle nut 332 and a first movably positioned component 376.

The threaded spindle 330 is positioned so it is rotationally movable and axially fixed and may be driven alternately in opposite directions by an electric motor (not shown). To drive the threaded spindle 330, the output shaft of such an electric motor may be coupled rotationally fixed to the threaded spindle 330, for example. However, further components may also be connected between the electric motor and the threaded spindle 330, for example. Thus, for example, one or more gearwheel stages may be provided between the electric motor, which cause a transmission that has an absolute value greater than one, less than one, or equal to one. The threaded spindle 330 has an external thread 520 on its radial external surface.

The first component 376 is positioned so it is axially fixed and rotationally movable. It may be an eccentric, for example, and is referred to the following as the eccentric 376. The rotational axis of the eccentric 376 is concentric to the rotational axis of the threaded spindle 330, and/or is congruent thereto. The eccentric 376 has an eccentric disk 392. This eccentric disk 392 has an essentially cylindrical implemented radial external mantle surface, which is implemented having a shoulder here. Furthermore, the eccentric 376 has a sleeve-like section 378. This sleeve-like section 378 extends axially on both sides of the eccentric disk 392. While the eccentric disk 392 is laid essentially eccentrically to the rotational axis of the eccentric 376, the sleeve 378 is laid essentially concentrically to this rotational axis.

The eccentric 376 forms a radial internal cavity 522. This cavity 522 may be implemented as an axial passage or channel, for example. The threaded spindle 330 extends into and/or through this cavity 522. This cavity 522 and the threaded spindle 330 are dimensioned in such a way that a radial intermediate space 524 is implemented between the threaded spindle 330 and the eccentric 376.

The spindle nut 332 has an internal thread 526, which engages in the external thread 520 of the threaded spindle 330. For example, the spindle nut 332 has an axial extension 512, which is implemented like a sleeve here. A first section 528, in the form of an annular disc or cylinder, of the spindle nut 332 projects radially outward over a type of shoulder before this axial extension 512. In the direction facing axially away from the axial extension 512, a cylindrical second section 530 of the spindle nut 332 adjoins the first section 528 of the spindle nut 332, which extends essentially axially. This second section 530 of the spindle nut 332 may, for example, be positioned radially on the outside of the first section 528 of the spindle nut 332. In the direction facing axially away from the axial extension 512, a third section 532 of the spindle nut 332, which is implemented as a cylinder or an annular disc, adjoins the second section 530 of the spindle nut 332. This third section 532 extends radially outward from the second section 530 of the spindle nut 332.

The internal thread 526 of the spindle nut 332 is provided radially on the inside on the axial extension 512 of the spindle nut 332, but may also be positioned in another location in another embodiment of the spindle nut 332.

The spindle nut 332 and/or the axial extension 512 of the spindle nut 332 and/or the radial intermediate space 524 implemented between the threaded spindle 330 and the eccentric 376 are implemented in such a way that the spindle nut 332 and/or the axial extension 512 of the spindle nut 332 may extend into this radial intermediate space 524. For example, the spindle nut 332 and/or the axial extension 512 of the spindle nut 332 may extend into this radial intermediate space 524 in every axial position of the spindle nut 332.

A twist lock may be provided, using which the spindle nut 332 may be secured against twisting in relation to a housing, such as an actuator housing, which is not shown in FIGS. 1 through 5. Such a twist lock may particularly be one as provided in the embodiments according to FIGS. 1 through 24 of DE 10 2004 038 955, and particularly in FIG. 12 therein (cf. reference numbers 336, 338, and 346 of FIG. 12 therein in particular). The content of the disclosure of DE 10 2004 038 955 is particularly included in its entirety in the current disclosure through reference in this regard. Therefore, a wedge or tooth may particularly be provided on the spindle nut 332 or a part connected thereto—particularly rotationally locked—which may engage in a wedge gearing fixed on the housing in order to cause a twist lock between the spindle nut 332 and the housing. In this case, in particular, the twist lock may engage for every gear of the transmission and/or for the rotational positions of the spindle nut 332 which are possibly assigned to these gears.

A twist lock of this type may particularly be provided in order to cause and/or support the axial traveling of the spindle nut 332 as threaded spindle 330 is rotating.

In particular, the twist lock between the housing and the spindle nut 332 does not act over the entire axial position range of the spindle nut 332. In relation to FIG. 1 of this disclosure, the axial position range of the spindle nut 332 in which such a twist lock acts is particularly provided right of the axial position, which is shown in FIG. 1.

In an axial position range and/or axial position different from this axial position range in which the twist lock acts, which preferably adjoins the above-mentioned range nearly directly, the spindle nut 332 is positioned so it is essentially rotationally movable. This may particularly be caused by the spindle nut 332 having moved out of a twist lock in relation to the housing in this position range. This range may be approached in that the threaded spindle 330 and/or the electric motor connected thereto are rotated and/or rotate in such a way that the spindle nut 332 travels in the direction of the eccentric 376. The corresponding rotational direction of the threaded spindle 330 and/or of the electric motor corresponds to the selection direction of this threaded spindle 330 and/or this electric motor. Through driving of the spindle nut 332 of this type, this nut may be moved into a position shown in FIGS. 1 through 5 and/or into a stop position, which will be discussed in the following.

The eccentric 376 and/or a sleeve-like section 378 of the eccentric 376 and the spindle nut 332 form areas which interact to form a rotational carrier unit—already discussed above—such as an (external) wedge gearing laid on a radially internal surface of the eccentric 376 and/or the sleeve-like section 378 and an (external) wedge gearing, placed on the radially external surface of the spindle nut 332 or an axial extension of the spindle nut 332, for engaging in the (internal) wedge gearing of the eccentric 376 and/or the sleeve-like section 378. This wedge gearing connection may be implemented in position in such a way as is schematically indicated in the cutaway area of FIG. 6a by the arrow 491, for example, which is also schematically indicated by the arrow 491 in FIG. 1.

A stop is particularly provided for the spindle nut 332. In the stop position of the spindle nut 332—already briefly discussed above—on this stop, the spindle nut 332 is caused essentially to not travel axially and/or be blocked when the threaded spindle 330 rotates in its selection direction. However, the stop may also be implemented as elastic or damping, for example. This stop is particularly implemented so that it allows axial travel of the spindle nut 332 and/or does not block it in the stop position of the spindle nut 332 on this stop when the spindle nut 332 is loaded by the threaded spindle 330 in the opposite direction, i.e., the threaded spindle 330 particularly rotates in the opposite direction (to the selection direction). The rotation of the threaded spindle 330 in this opposite rotational direction corresponds to a shift movement of the spindle 330.

The stop discussed for the spindle nut 332 may be formed, for example, by the eccentric 376 and/or its sleeve 378 or by a radial projection of the threaded spindle 330 or by a stop fixed on the housing.

In the position shown in FIGS. 1 through 5, the spindle nut 332 is rotationally movable. The stop position discussed of the spindle nut 332 is particularly provided in this position. The stop position of the spindle nut 332 discussed may be achieved essentially directly after leaving the twist lock in relation to the housing, i.e., after an at least very short axial displacement path of the spindle nut 332. Embodiments in which the axial displacement path, which the spindle nut 332 must cover after leaving the twist, lock in relation to the housing up to the stop position discussed are also preferred.

In particular in order to cause and/or support the axial travel of the spindle nut in the direction of the stop position discussed upon a corresponding rotational direction of the threaded spindle 330 (i.e., after leaving the twist lock discussed in relation to the housing), a friction unit may act on the spindle nut 332 or the eccentric 376. In the latter variation, the traveling discussed may particularly be caused and/or supported working together with a rotational carrier unit, which will be discussed in the following.

If the threaded spindle 330 is loaded (by the electric motor) in the selection direction and/or in the event of movement and/or rotational movement, particularly continued in the stop direction of the spindle nut 332, the threaded spindle 330, the spindle nut 332, and the eccentric 376 rotate and/or move jointly, which is particularly true if the twist lock between the spindle nut 332 in the housing is disengaged. This may be exploited to select a gear.

In particular, the rotational movement for selecting may be converted into a linear movement of a second component, particularly a sleeve (cf., for example, reference number 400 of DE 10 2004 038 955) using at least one mechanism engaging in the eccentric 376—corresponding to the embodiments explained on the basis of FIGS. 9a through 24 of DE 10 2004 038 955, for example.

The selection direction of the threaded spindle 330 and/or the rotational movement of the threaded spindle 330 in the selection direction and/or the selection movement of the threaded spindle 330 is schematically indicated in FIG. 1 by the arrow 492, and the shift direction of the threaded spindle 330 and/or the shift movement of the threaded spindle 330 in the shift direction and/or the shift movement of the threaded spindle 330 is schematically indicated in FIG. 1 by the arrow 534.

In particular, one rotational direction of the electric motor corresponds to a movement in the shift direction and the opposite rotational direction corresponds to a movement in the selection direction.

A braking unit and/or a locking unit and/or a blocking mechanism 500 is provided between the eccentric 376 and the spindle nut 332. This braking unit and/or locking unit and/or this locking mechanism 500 are referred to in the following as the braking unit 500 for simplicity. However, it is to be noted that a locking unit and/or a blocking unit may particularly be provided and/or the braking unit 500 may be implemented correspondingly.

The braking unit 500, which may also be implemented differently in principle, is implemented in such a way in the exemplary embodiment according to FIGS. 1 through 5 that it has a spring 502, which is implemented here as a coil spring. The coil spring 502 extends essentially parallel to the central longitudinal axis of the threaded spindle 330, particularly the axis outside the wedge gearing(s), via which the eccentric 376 and the spindle nut 332 are engaged. The spring 502 is supported on one side on the eccentric 376, on the eccentric disk 392 here, and loads a ball 504 on the other side. A ring 506 is provided between the ball 504 and the spring 502, which is axially loaded by the spring 502 and presses the ball 504 into a passage 508 of the eccentric 376, which extends radially inward. This passage 508 may be implemented so that it is essentially circular, for example. For example, it may have a diameter, which essentially corresponds to the ball diameter and/or is slightly larger. The passage 508 may, for example, be provided in a sleeve-like section 378 of the eccentric 376, as shown in FIGS. 1 through 5.

The spindle nut 332 has a depression 510, which is a groove or a pocket, for example. A groove of this type may, for example, be a groove, which extends at least partially or closed around the central longitudinal axis of the spindle nut 332 and/or in a plane transverse to this longitudinal axis, for example. This depression 510 is suitable for receiving and/or partially receiving the ball 504. The depression 510 is provided in the exemplary embodiment in the radial external surface of the spindle nut 332 and/or an axial extension 512 of the spindle nut 332. In a blocking position of the braking unit 500, the ball 504 is pressed into this depression 510. The depression 510 is implemented in such a way that the ball 504 is not completely positioned and/or sunk into the depression 510 in the blocking position of the braking unit, but rather is positioned projecting out of this depression and/or blocking between the spindle nut 332 and the eccentric 376. This is particularly in such a way that the spindle nut 332 is supported in relation to the eccentric 376, and/or vice versa.

In particular, in the blocking position of the braking unit 500, this braking unit 500 fixedly couples the nut 332 in relation to the eccentric 376 in the rotational direction and the axial direction by interacting with the threaded engagement between the spindle 330 in the spindle nut 332 and by interacting with the rotational carrier and/or wedge gearing which is provided between the spindle nut 332 and the eccentric 376. However, this coupling is implemented in such a way that it may be loosened. For this purpose, the ball 504 is particularly held in the depression 510 with a retention force, it being able to travel out of the depression 510 when this retention force is overcome. In particular, by adding the braking unit 500 between the eccentric 375 and the spindle nut 332, the mass inertia energy and/or mass inertia force and/or mass inertia torque of the eccentric and/or components connected thereto must overcome the closing force and/or retention force, which is identified in FIG. 2 by FI, in order to move the ball out of the depression and/or the pocket 510 and allow the nut 332 to travel along the spindle 330.

The retention force is particularly dimensioned in such a way that, particularly considering the maximum drive energy of the electric motor, the inertial energy and/or the mass inertia torque, and particularly the maximum mass inertia torque of the eccentric 376 and/or a maximum replacement mass inertia torque, which also considers the influence of the inertial masses of any components coupled to the eccentric 376 on the side facing away from the spindle nut 332, is prevented from being insufficient to move the braking unit out of its blocking position and/or to move the ball 504 out of its depression when the motor and/or the spindle 330 is stopped in its movement.

Thus, in particular, a load is applied between the eccentric 376 and the spindle 330 using the ball 504 and/or using multiple balls 504, which are particularly positioned to function as a block and/or a lock. It may be expedient to implement the force acting on the lock as small as possible in order to prevent an interaction with any desired shift action. The force discussed is, however, particularly greater than the mass inertia torque which is caused by the rotating mass inertias and/or replacement mass inertias (cf. above), which are connected to the eccentric and any parts coupled thereto. This load here is generated using the spring 502, which acts on the ring and/or closing ring 506. This load may be adjustable by changing the load applied by the spring 502, which may also be performed using a suitable adjustment unit, for example.

Particularly when the motor starts from its rest position and the braking unit is in the block position, the electric motor loads the spindle 330, which, with sufficient drive energy of the electric motor, causes, via its engagement with the spindle nut 332, the ball 504 to be pressed out of the depression, so that the threaded spindle 330 may drive the spindle nut 332 and the eccentric 376 to rotate. When the spindle nut 332 and the eccentric 376 are driven to rotate by the threaded spindle 330 and/or the electric motor, and the threaded spindle 330 and/or the electric motor is then suddenly stopped, the spring 502 presses the ball 504 into the depression 510 and/or closes the braking unit 500, which may particularly be caused automatically.

Figure 2:
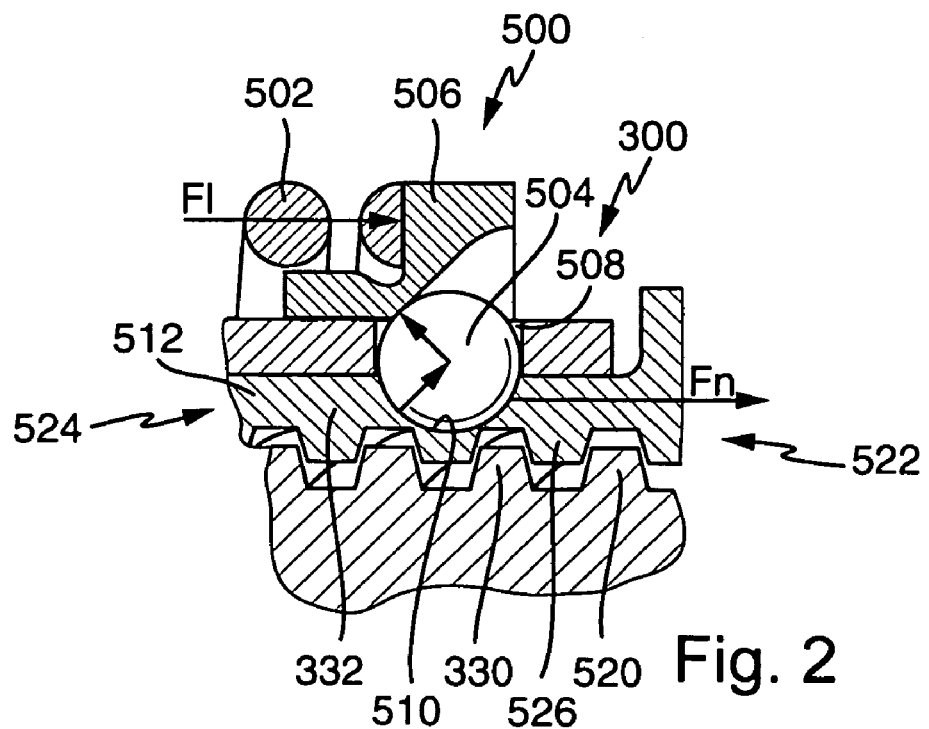
FIG. 2 shows an enlarged detail from FIG. 1.
Figure 3:
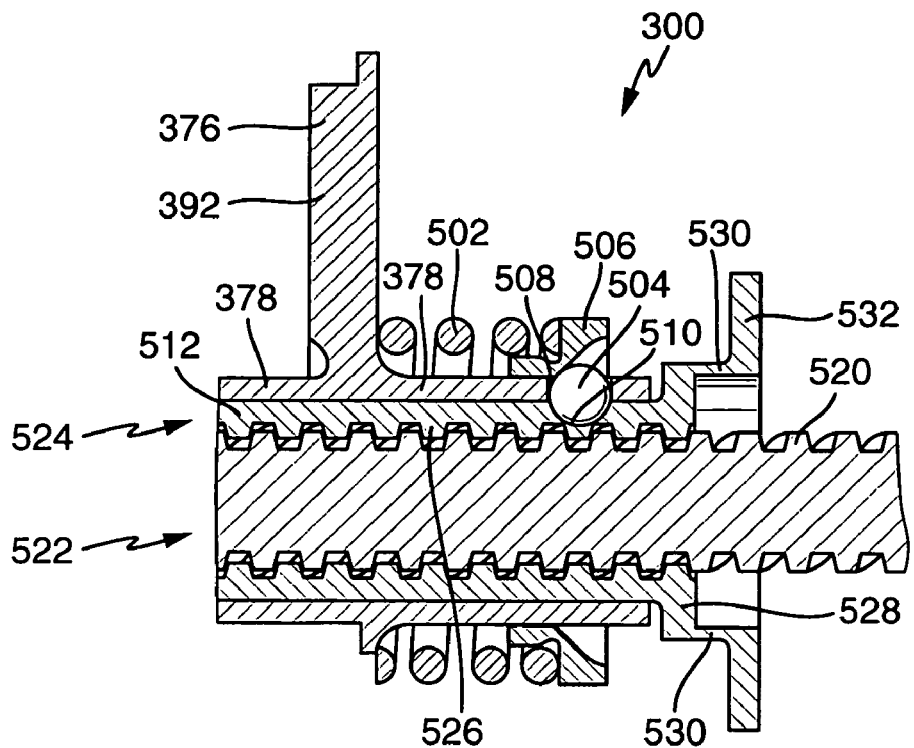
FIG. 3 shows the embodiment according to FIG. 1 in a locked position of the braking unit and/or locking unit.
Figure 4:
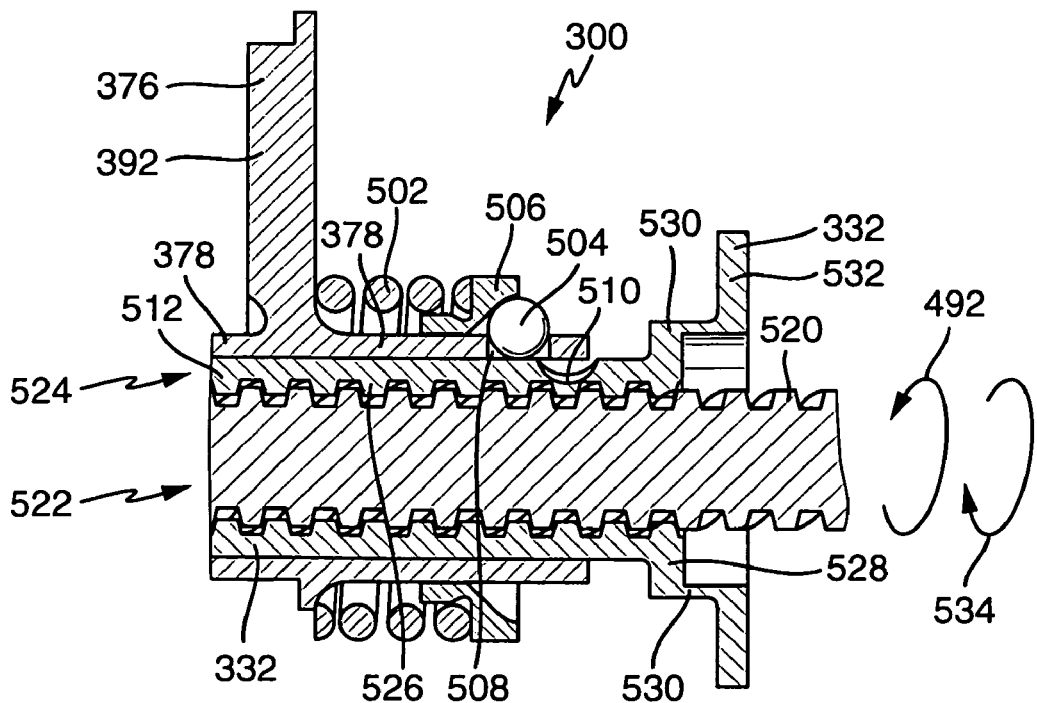
FIG. 4 shows the embodiment according to FIG. 1 in a loosened position of the braking unit and/or locking unit.
Figure 5:
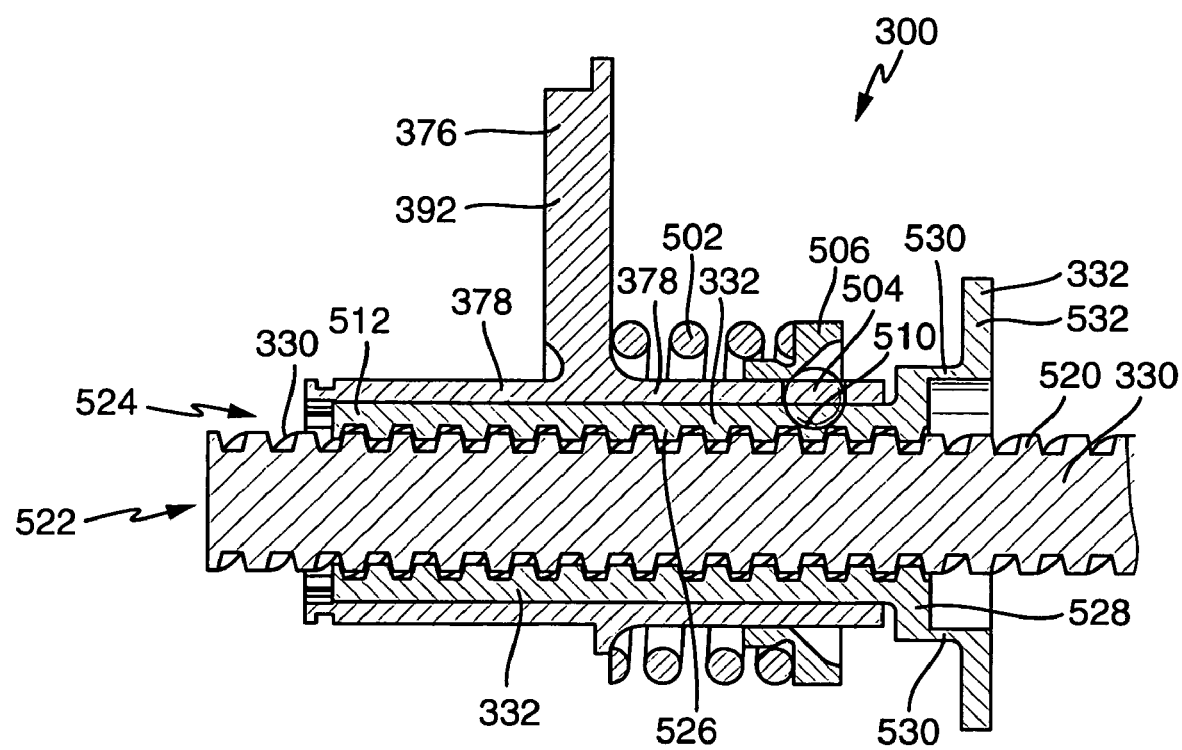
FIG. 5 shows the embodiment according to FIG. 1.
Figure 6A:
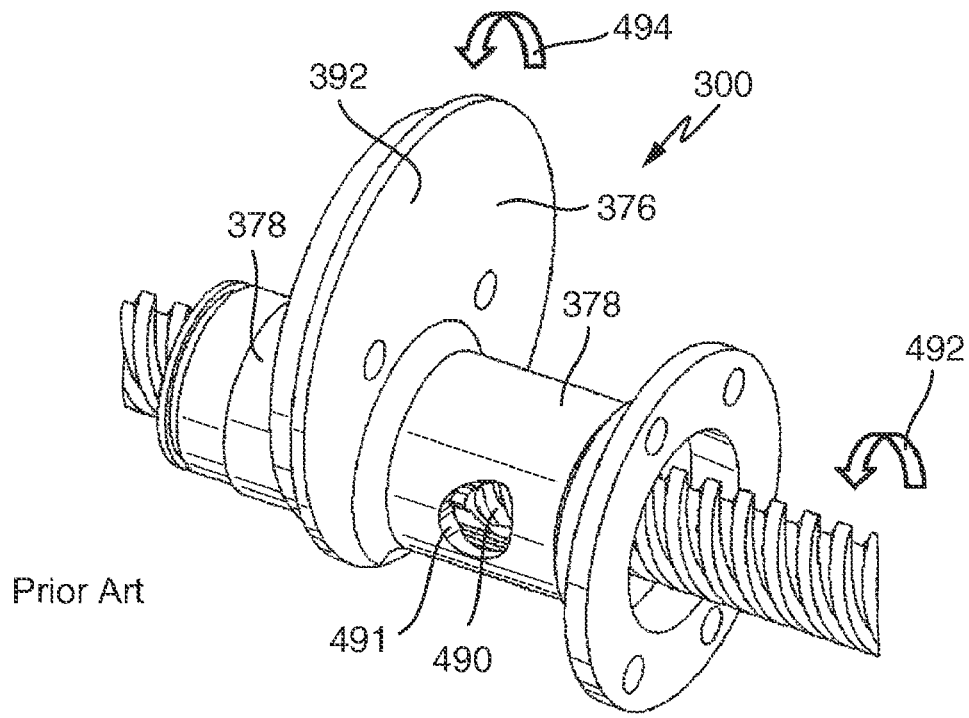
FIG. 6a and FIG. 6b show an embodiment of an actuating device previously known to the applicant.
Figure 6B:
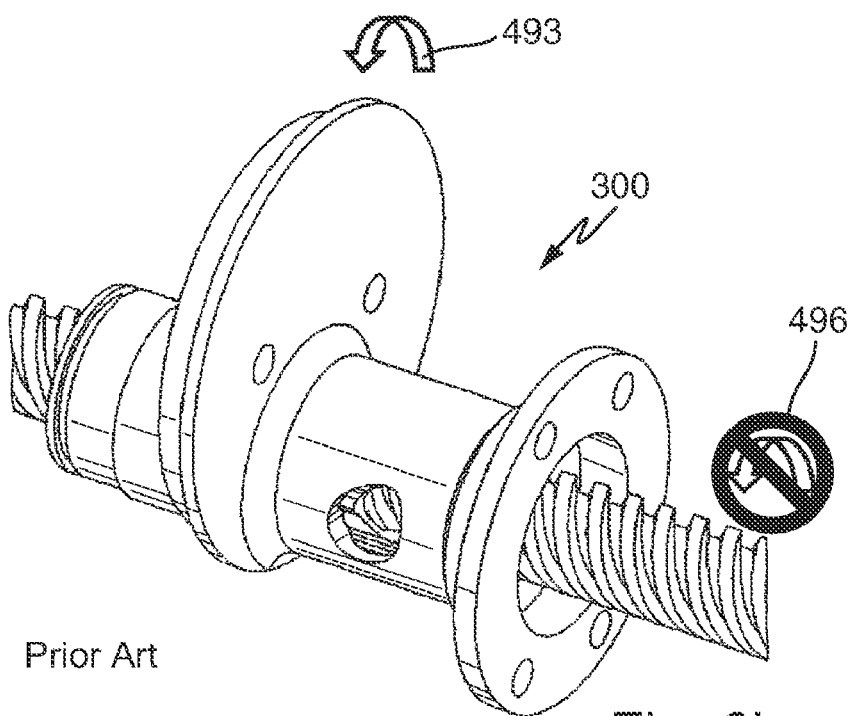

An actuating device and/or a 1-motor transmission actuator of this type is shown in FIG. 1, FIG. 2 showing an enlarged detail. This embodiment is also shown in FIGS. 3 and 4, the blocking position of the braking unit being shown in FIG. 3 and the open position of the braking unit being shown in FIG. 4. As may be inferred from FIG. 4, the ball 504 has traveled out of the depression 510 here, which was caused through a corresponding drive energy of the electric motor and through corresponding driving and/or loading of the threaded spindle 330 and/or the spindle nut 332 using the electric motor. As before, the ball 504 engages in the passage 508, but is not pressed into the depression 510 via the ring 506. When the threaded spindle 330 and/or the electric motor is stopped in its movement, the ball 504 is pressed into the depression 510 again, so that the braking unit is in the blocking position and further rotation of the eccentric 376 and continued travel of the spindle nut 332 on the threaded spindle 330 is immediately prevented. FIG. 5 differs from FIGS. 1 and 3 particularly in that the eccentric 376 and/or the spindle nut 332 are not shown cut away on the left.

An inertial mass brake for a 1-motor transmission actuator is particularly provided by this embodiment. The mechanism discussed is particularly similar to a quick-acting closure for a holder for an air hose and/or brake hose, but has a different application. The embodiment explained on the basis of FIGS. 1 through 5 may be used in principle in all and/or greatly varying applications of a 1-motor transmission actuator in order to achieve the most rapid possible shift speeds. However, the use in an embodiment as was described on the basis of FIGS. 9a through 24 of DE 10 2004 038 955 is particularly advantageous. The 1-motor transmission actuator is particularly implemented in such a way that it may activate shifting of gears in essentially any arbitrary sequence.

REFERENCE NUMERALS 300 actuating device
330 threaded spindle
332 spindle nut and/or nut
376 eccentric
378 sleeve-like section of 376
392 eccentric disk of 376
490 arrow (threaded connection)
491 arrow (wedge gearing connection)
492 arrow (selection direction of 330)
493 arrow (mass inertia torque and/or mass inertia energy)
494 arrow (selection direction of 376)
496 symbol
500 braking unit and/or locking unit and/or blocking mechanism
502 spring
504 ball
506 ring
508 passage in 376
510 depression in 332
512 axial extension of 332
520 external thread of 330
522 radial interior cavity of 376
524 radial intermediate space between 330 and 376
526 internal thread of 332
528 first section of 332 in the shape of an annular disc or cylinder
530 cylindrical second section of 332
532 third section of 332 in the shape of an annular disc or cylinder
534 shift direction of 330 (arrow)

What is claimed is:

1. An actuating device for engaging gears of a motor vehicle transmission, the actuating device comprising:
   a spindle having an external threading, the spindle being rotationally movable and axially fixed;
   a first component comprising a sleeve arranged around the spindle and a passage adapted to receive an element therethrough, the first component being axially fixed and rotationally movable for selecting gears of the motor vehicle transmission, wherein the sleeve and the spindle define a radial intermediate space therebetween;
   a spindle nut comprising an axial extension extending into the radial intermediate space, an external depression adapted to partially receive the element, and an internal threading threaded with the external threading of the spindle, wherein the spindle nut is arranged to be driven in a first axial direction when the spindle is rotated in a first rotational direction and a second axial direction when the spindle is rotated in a second rotational direction; and,
   a locking unit comprising a ring arranged around the sleeve, a spring arranged between the first component and the ring, and the element, wherein the spring supplies a retention force to the ring in the second axial direction for pressing the element into the passage and external depression when the passage and the external depression are aligned and the spindle nut is not being driven in the first axial direction, the first component and the spindle nut are axially and rotationally locked when the element is arranged within the passage and the external depression, and the retention force is overcome and the element is forced out of the passage and the external depression when the spindle nut is driven in the first axial direction.

2. The actuating device recited in claim 1 wherein the element is a ball.

3. The actuating device recited in claim 1 wherein the first component further comprises an eccentric disk extending radially from the sleeve.

4. The actuating device recited in claim 1 wherein the first component and the spindle share a rotational axis.

5. The actuating device recited in claim 1 wherein the spring is a coil spring arranged concentrically around the sleeve.

* * * * *